Feb. 6, 1951     C. F. REED     2,540,348
APPARATUS FOR TREATING PLANT MATERIAL
Filed July 8, 1944     3 Sheets-Sheet 1

INVENTOR
CORTES F. REED
By Paul, Paul & Moore
ATTORNEYS

Feb. 6, 1951        C. F. REED        2,540,348
APPARATUS FOR TREATING PLANT MATERIAL
Filed July 8, 1944        3 Sheets-Sheet 2

INVENTOR
CORTES F. REED
By Paul, Paul & Moore
ATTORNEYS

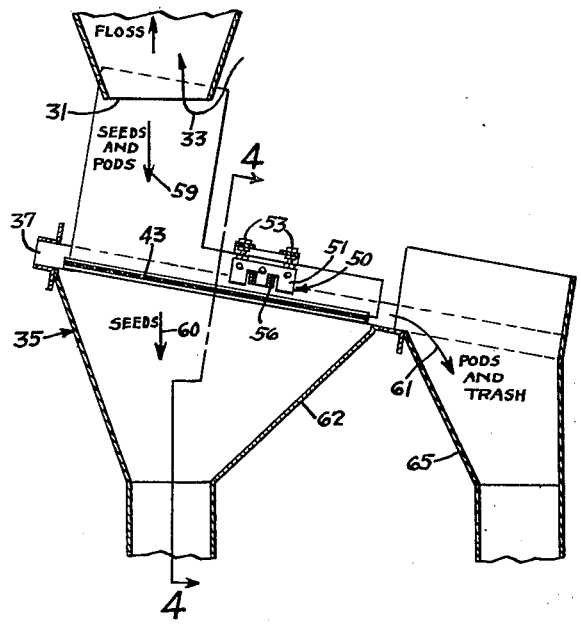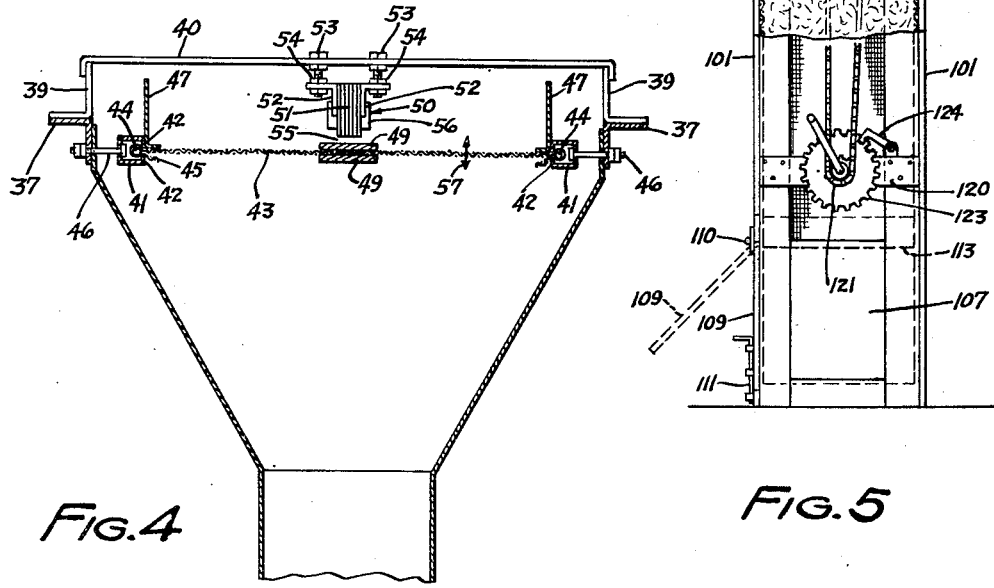

Patented Feb. 6, 1951

2,540,348

UNITED STATES PATENT OFFICE 2,540,348

APPARATUS FOR TREATING PLANT MATERIAL

Cortes F. Reed, Anoka, Minn., assignor to Federal Cartridge Corporation, Minneapolis, Minn., a corporation of Minnesota Application July 8, 1944, Serial No. 544,082

2 Claims. (Cl. 19—1)

This invention relates to method and apparatus for separating the floss, seeds and pods of the milkweed plant. In nature each individual milkweed seed is attached to a plurality of hair-like filaments of floss which serve as the buoyant support for carrying the seed in the wind when the pod opens. There are a great many seeds in each milkweed pod and when the pod is ripe and dry it bursts open along a natural cleavage line of the pod and the seeds are liberated.

I have discovered that milkweed floss, seeds and pods are individually useful, but for maximum usefulness they must be separated from each other. To accomplish this end by hand means is so costly as to preclude the economic use of these valuable materials.

It is an object of the present invention to provide a method and apparatus for separating the floss, seeds and pods of the milkweed plant, either when they are in the mature green stage or mature dry stage. It is a further object of the invention to provide a method and apparatus to obtain floss, seeds and pods substantially free from intermingling and contamination one by the other. It is a further specific object of the invention to provide a method and apparatus for obtaining separation of the floss, seeds and pods of the milkweed plant when such materials are in the mature green, and hence somewhat damp stage due to the natural moisture therein contained.

Other and further objects of the invention are those inherent in the apparatus herein illustrated, described and claimed.

The invention is illustrated with reference to the drawings in which

Figure 3 is an enlarged fragmentary view, partly in section, of a portion of the invention;

Figure 4 is an enlarged fragmentary view, partly in section, taken along the lines of 4—4 of Figure 3;

Figure 5 is an enlarged side elevational view, partly broken away and partly in section, illustrating the collection and baling apparatus portion of the apparatus of the invention; and Figure 6 is a fragmentary sectional view taken along the line 6—6 of Figure 1.

Throughout the drawings corresponding numerals refer to the same parts.

Figure 1:
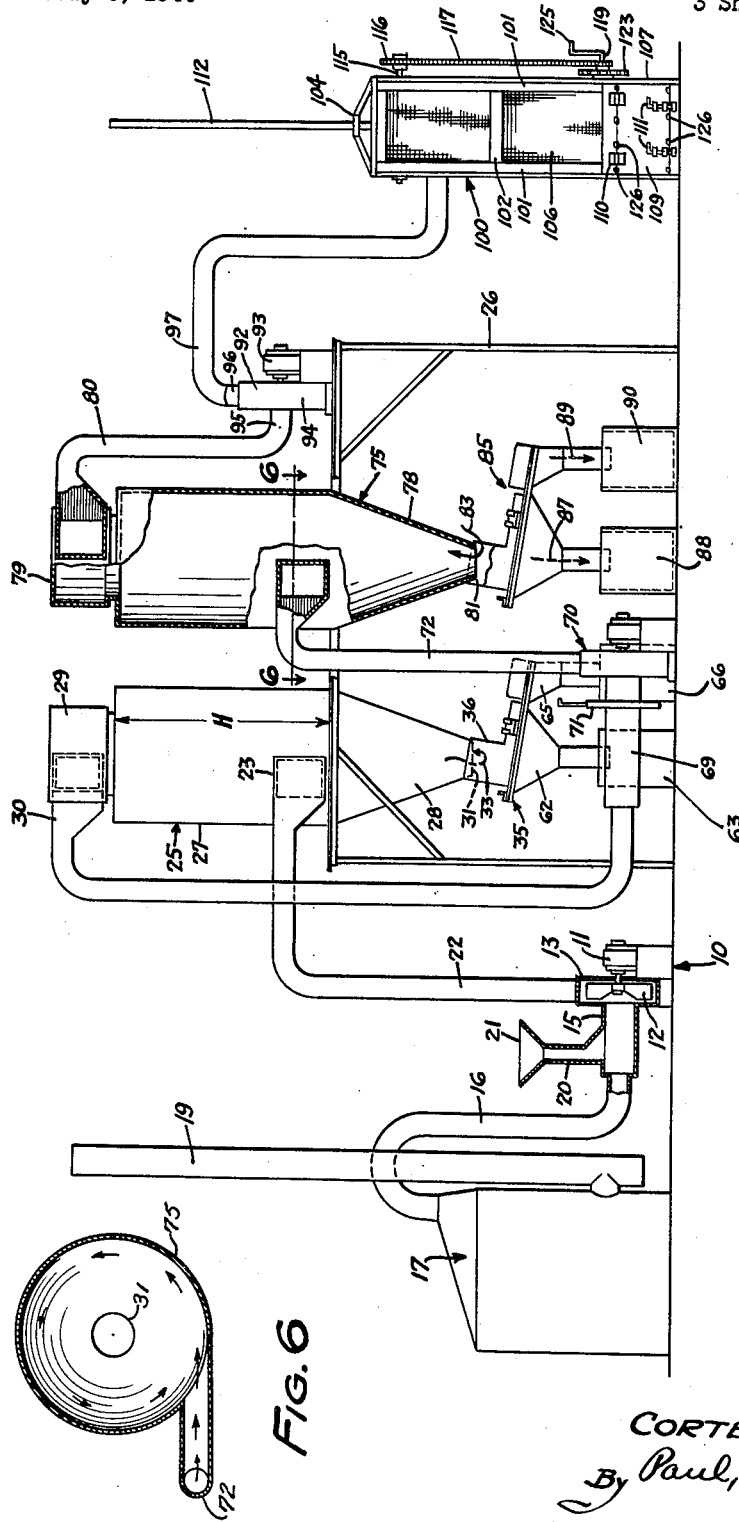
Figure 1 is a side elevational view, partly in section, illustrating one form of the apparatus of the invention suitable for carrying out the methods thereof.

Referring to Figure 1 there is illustrated an apparatus for separating the components of the milkweed pod, viz. the floss, seeds and pod structure. The apparatus includes a centrifugal blower generally designated 10 consisting of an electric motor or other prime mover 11 which is directly coupled to drive the blower fan 12 which is preferably though not necessarily a four or six-bladed fan, depending upon the speed of the motor. The fan revolves in a scroll casing 13 of usual design having an inlet tube 15 co-axially arranged on the casing 13. The inlet tube is connected to a warm air duct 16 leading to a furnace or air heater generally designated 17 which may be of gas, coal or oil fired variety, provided with a chimney 19. The air may also be heated by steam or other means. The furnace is of any suitable construction capable of furnishing a relatively large volume of air which is heated to a temperature suitable for extracting moisture from the milkweed pod, seeds and floss. For this purpose an air temperature of 130° F. is usually sufficient, though a greater or lesser temperature may be utilized, if desired. The inlet tube is provided with a vertical side inlet 20 having hopper 21 thereon for the introduction of the pod, seed and floss. Any mechanical feeding device desired may be connected at tube 20 in place of the hopper 21, if desired. The outlet tube 22 of the centrifugal blower housing 13 is connected at 23 to a cyclone separator generally designated 25.

The separator 25 as well as other portions of the apparatus, hereinafter described, is supported on a structural framework 26 at a suitable elevation. The cyclone separator includes a cylindrical upper section 27 and a conical lower section 28, the inlet 23 thereto being arranged tangentially as indicated in Figure 6. The upper cylindrical portion 27 of the separator has a greater height H than is customarily employed in the usual cyclone separator and at the top of it there is arranged a bonnet 29 which forms the normal air withdrawal outlet of the separator. The bonnet 29 has connected thereto the outlet pipe 30 which may be either radially or tangentially connected, as desired.

The lower conical bottom 28 of the separator is necked down as indicated at 31 and constitutes the solid material outlet of the separator. For the purpose of this invention the seed and pod portions of the milkweed plant are considered as solid material, whereas the floss thereof, actually solid though very buoyant, is carried by the air passed through the apparatus and is withdrawn at outlet 30.

The passage of the pods, even mature green (closed) pods through the blower serves to open the pods, and the seeds and floss are liberated and the seeds knocked off. The warm air dries the seeds and floss, if not already dry, and partially dries the pods.

The seed and the pod portions of the milkweed plant together with any contaminating leaves and extraneous material, are separated from the floss in the centrifugal separator and are discharged onto a screening apparatus generally designated 35. The necked-down portion 31 of the cyclone separator discharges into the inlet 36 of the screening apparatus but there is sufficient clearance between the inlet 36 and the lower conical edge 31 of the separator so as to permit a controlled, small amount of air to enter via arrow 33. It is my belief that the actual separation of the floss from the seeds and pods takes place for the most part in the region near the bottom 31 of the conical portion 28 of the separator, due to the uprush of the controlled, small amount of air at this point. The floss is floated off and the seeds and pods, being heavier, flow down, counter to the air entering at this point.

The screening device 35 is illustrated in detail in Figures 3 and 4 and includes a suitable framework 37 of spaced angles and a cover composed of angles 39 and plate 40. The frame members 37—37 serve as anchors for the flanged channels 41 which have in-turned opposed flanges 42 presenting a slight space therebetween. The screen element 43 forms a plane between the channels 41—41, the screen being inserted through the space between the inturned flanges 42—42, wrapped around a rod 44 at each side and the fragmentary end of the screen brought out, as indicated at 45. Tension on the screen is achieved by means of a plurality of tensioning bolts 46 which serve to stretch the screen sideways. Inner hopper walls 47 within the cover serve to direct the ingoing seeds and pods upon the screen.

At the center of the screen there are fastened a pair of armature plates 49 which cooperate with the alternating current magnet generally designated 50. The magnet 50 is energized with alternating current of commercial frequency and is provided with a plurality of laminations 51 of generally E-shaped construction clamped between angles 52, the angles being in turn supported on screws 53 which are of suitable length and are provided with nuts 54 so as to permit adjustment of the entire magnet unit in a vertical direction and thereby vary the spacing 55 between the face of the laminated magnet core and the armature 49. The coil structure for energizing the magnet core is indicated at 56. Alternating current of any suitable commercial frequency is applied to the magnet coil 56 and as a consequence the armature 49—49 is vibrated in a vertical direction, as indicated by the double arrow 57, thus causing the screen also to vibrate. The mechanical frequency of the vibrator screen may be tuned by adjustment of the tension on bolts 46 and may be tuned in resonance or out of resonance with the alternating current energizing the magnet structure 50, as desired.

Referring to Figures 1 and 3 the floss-seed-pod mixture produced by the action of blower 13 is blown in a warm air stream, into the cyclone separator 25 where it swirls within the separator and is met by the up-rushing stream of air which enters the lower edge 31 of the separator cone 28, as indicated in Figure 3. The floss, or a major portion of it, is floated off and rises in the upper cylindrical portion 27 of the separator and is withdrawn through the normal air outlet 30, whereas the seeds and pods, being heavier are discharged as indicated by the arrow 59 upon the screen structure 35 where, due to the vibration of screen 43, the seeds are sifted through, as indicated by the arrow 60, and the pods and extraneous stem and leaf material are discharged, as indicated by the arrow 61. The seeds are collected in the hopper 62 of the screening device and are deposited in any suitable receptacle 63, whereas the pods and extraneous material are collected by the hopper 65 and are deposited into receptacle 66.

In the first separation which occurs in cyclone separator 25 some seeds adhere to the floss and the discharge from the first separator via pipe 30 is communicated to the entrance tube 69 of a second blower fan generally designated 70 which is preferably identical in structure with that shown at 10, except that a damper gate 71 is provided in the inlet pipe 69 for regulating the inflow to the housing of blower 70. Blower 70 serves to apply a suction on pipes 69 and 30, and hence upon the outlet of separator 25. The blower 70 discharges through pipe 72 tangentially into a second cyclone separator 75 which may be identical in construction with that shown at 25. A second separation takes place in the cone structure 78 of the separator 75 and air is admitted at the lower edge 81 via arrow 83, as in separator 25. The floss is drawn off in remarkably clean form via the bonnet 79 and discharge pipe 80, whereas the seeds and occasional bits of pods which may have been carried over from the first separation are screened in the screening apparatus 85 which is identical with that shown at 35. The seeds are screened out and deposited via arrow 87 into receptacle 88, whereas the pods and any adherent extraneous material are deposited via arrow 89 into receptacle 90. A suction is applied to outlet tube 80 of second separator 75 by means of a suction blower 92 which may conveniently be identical with that illustrated at 10 and 70. Blower 92 is powered by a suitable motor 93 and includes a scroll casing 94 having an inlet 95 and an outlet 96 which is connected to pipe 97 leading to the floss collection apparatus generally designated 100.

Referring particularly to Figure 5, the floss collection apparatus consists of a cylindrical, preferably vertical, container of preferably rectangular cross section. The container consists of corner frame posts 101 having cross braces as indicated at 102, a top end plate 103 and a top brace frame 104. The side walls of the floss collection apparatus are principally of screen wire or other air-pervious material 106 except at the bottom where solid walls 107 are provided all around. One or more of the walls is made in the form of a door as indicated at 109 which is hinged at 110 and provided with a suitable latch 111 so that the bale of floss formed as subsequently described, may be removed from the collector. The open position of door 109 is shown in dotted lines in Figure 5. The brace frame 104 at the top of the collector serves as a guide for a long rack bar 112 to which an inner head 113 is attached. The rack is raised and lowered by gear 114 which is rotated on its mounting shaft 115 by means of a sprocket 116 actuated by the long chain 117 leading to the crank shaft 119. The crank shaft is mounted on frame 120 and is provided with a small sprocket 121 serving to drive the chain 117 and hand crank 125. A ratchet 123 and pawl 124 are provided so as to lock the crank shaft from rotation in either direction whenever the pawl 124 is lowered on the ratchet.

For floss collection the crank shaft 119 is turned by means of handle 125 until the inner head 113 is raised to its uppermost position, as indicated at 113′ in Figure 5. Pipe 97 which carries a stream of air laden with cleaned floss discharges into the interior of the collection apparatus 100 and the floss is trapped against screen 106 whereas the air passes through it. This operation is continued until a fairly dense column of floss is collected, whereupon the separator is shut down for a short time (or the flow of pipe 97 diverted to a second collector and baler) and the pawl 124 of baler 100 is released. The crank 125 is then turned to force the head 113 downward. The downward movement squeezes air out of the column of milkweed floss and compacts it into a dense bale which is gradually squeezed into the solid wall space defined by the walls 107 and the door 109 and by the bottom of the apparatus 100 and inner head 113. Tying wires or cords are then inserted through suitable openings 126 and the bale tied and removed. If desired, provision may be made for temporarily holding bottom and top boards on the bale so as to facilitate the tying operation. The bale should not be compressed to a volume of less than $\frac{1}{12}$ the volume of the collector, viz. the volume between the bottom plate and head 113 when raised to position 113′ because overcompression injures the floss. The moisture content of the final baled floss should be about 2–8% and the weight of the bale not more than 15 pounds per cubic foot. If desired, a plurality of combined collecting and baling apparatuses 100 may be provided and a valve provided in line 97 so that the plant need not be shut down during the baling operation. In such case the floss is simply diverted to the second baler while the first is run down and the floss baled.

Figure 2:
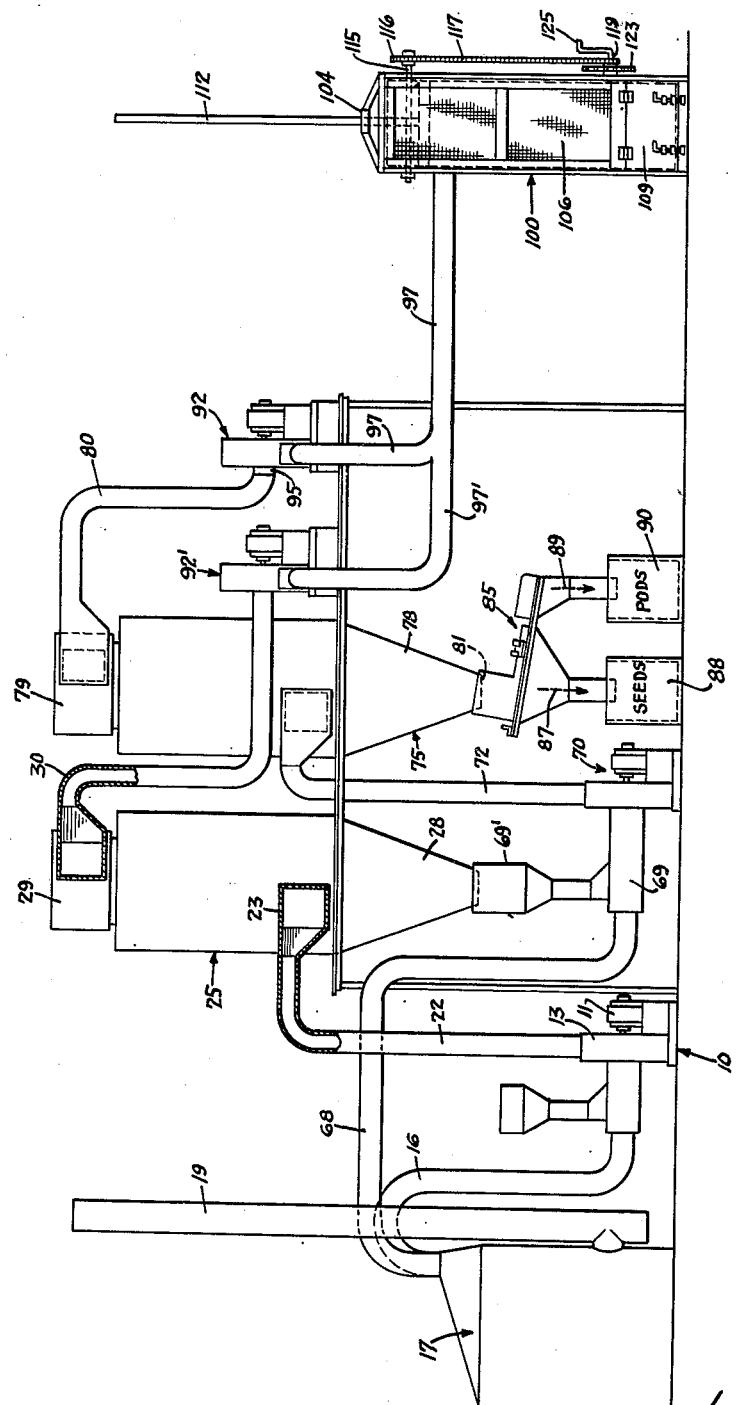
Figure 2 is a side elevational view, partly in section, illustrating a second form of apparatus of the invention suitable for carrying out the methods thereof.

Referring to Figure 2 there is illustrated a modified form of the invention representing a type of flow particularly adapted for the separation of fresh mature moisture-containing pods, seeds and floss. In this apparatus the elements are substantially the same except that the flow through the system is re-arranged. Thus, there is provided a furnace or other air-heating apparatus 17 providing a flow of air through pipe 16 to the first blower generally designated 10. Blower 10 discharges through pipe 22 into the tangential inlet 23 of the centrifugal separator 25 from which floss and air are withdrawn by a bonnet 29 and discharge pipe 30 to suction blower 92′, the outlet of which is connected at 97′ to pipe 97 leading to the floss collecting and baling apparatus generally designated 100. The solid material outlet in the base of cone 28 of the cyclone separator 25 discharges into spout 69′ leading into the inlet 69 of the second blower generally designated 70. Any pods not completely opened in blower 10 are broken open in blower 70. Warm air is also supplied to inlet 69 via pipe 68 and the outlet from blower 70 is conducted by a pipe 72 to the inlet of cyclone separator 75 wherein separation occurs, probably in the downwardly extending cone portion 78 and at the lower edge 81 thereof discharging seeds and pods upon the vibrating screen generally designated 85. Seeds are separated via arrow 87 and are collected in hopper 88 whereas pods and extraneous material are discharged via arrow 89 and collected at hopper 90. The air-floss mixture from separator 75 is withdrawn from bonnet 79 by means of pipe 80 leading to the inlet 95 of the suction blower 92. The outlet of the suction blower 92 is connected via pipe 97 to the floss collector and baler 100.

The apparatus shown in Figure 1 is best suited for the separation of the floss, seed and pod components of mature cured or dried milkweed components, whereas the apparatus shown in Figure 2 is best suited for the separation of the floss, seed and pod components of material uncured, viz. "green" components of the milkweed plant. For many purposes it is desirable to harvest the milkweed as soon as the seeds and floss are matured but prior to the time that the pods have dried, hardened and tend naturally to open. Several advantages are to be had by harvesting in the mature "green" stage. In the first place the pods stay closed during the incidental handling they receive during harvesting and thus conserve the floss and seed. In addition I have discovered that the oil yielded by the seeds of mature "green" plant material is of better quality, being of superior flavor and lighter color than that produced from mature seeds that have been permitted to dry naturally. These advantages are more fully explained and claimed in my co-pending application entitled "Milkweed Seed Oil," Ser. No. 523,357, filed February 21, 1944, now Patent No. 2,480,769.

Multiple stages each consisting of a blower and separator may be used in series or parallel or part series and part parallel arrangement. Thus for especially hard, not fully mature pods, it may be necessary to pass them through the blower-separator more than two times to obtain popping of a major percentage of the pods. In such an arrangement the floss liberated in the first stage separator is floated off, and the seeds, opened pods and unopened pods may then be sifted to remove the seeds thus far liberated, or if desired the mixture of seeds, opened pods and unopened pods conveyed to the intake of the second stage blower with or without added hot air, as moisture conditions warrant. This may be repeated in as many stages as is necessary to obtain complete opening of all pods, the seeds being carried along, or sifted out at each stage. Mature dry or mature cured (cut when green and then allowed to dry in stacks or bundles) can be opened and separated in one or two stages, usually. The floss floated off at each stage may be passed through a parallel stage with additional warm air for additional drying, if needed, and the seeds and separated pods, if excessively moist, may be passed through parallel stages with warm air for drying.

As many apparently widely different embodiments of this invention may be made without departing from the spirit and scope thereof, it is to be understood that I do not limit myself to the specific embodiments herein except as defined by the appended claims.

What I claim is:

1. The apparatus for separating milkweed floss, seed and pod material comprising a fan blower, means for introducing a mixture of milkweed floss, seeds and pods into the intake air stream of the blower, a cyclone separator connected to the outlet of the blower, a floss collection reservoir connected to the air outlet of the cyclone separator, a second cyclone separator, means including a second fan blower connected to the solid material discharge of the first cyclone separator for propelling the seed, pod and adherent floss mixture, together with additional warm air, into the intake of the second cyclone separator, and means for collecting the floss from the outlet of the second cyclone separator.

2. The apparatus of claim 1 in which screen means are attached to the solid material outlet of said second cyclone separator for sifting the seeds from adherent pod material.

CORTES F. REED.

REFERENCES CITED

The following references are of record in the file of this patent:

UNITED STATES PATENTS

| Number | Name | Date |
|---|---|---|
| 1,133,048 | Lundahl | Mar. 23, 1915 |
| 1,212,658 | Marx et al. | Jan. 16, 1917 |
| 1,224,898 | Brennen | May 8, 1917 |
| 1,597,826 | Reynolds | Aug. 31, 1926 |
| 1,675,941 | Lindsay | July 3, 1928 |
| 1,719,119 | McKain | July 2, 1929 |
| 1,864,940 | Reynolds | June 28, 1932 |
| 1,882,343 | Troth | Oct. 11, 1932 |
| 2,026,833 | Holland-Letz | Jan. 7, 1936 |
| 2,076,988 | Garrett | Apr. 13, 1937 |
| 2,090,955 | Taylor | Aug. 24, 1937 |
| 2,102,499 | Wallace | Dec. 14, 1937 |
| 2,223,543 | Berkman | Dec. 3, 1940 |
| 2,233,156 | Berkman | Feb. 25, 1941 |
| 2,375,186 | Berkman | May 8, 1945 |
| 2,375,187 | Berkman et al. | May 8, 1945 |